United States Patent [19]

Leuthen

[11] Patent Number: 4,598,353
[45] Date of Patent: Jul. 1, 1986

[54] THYRISTOR FIRING CIRCUIT FOR DETERMINING PHASE ANGLE

[75] Inventor: John M. Leuthen, Claremore, Okla.

[73] Assignee: Hughes Tool Company, Houston, Tex.

[21] Appl. No.: 669,143

[22] Filed: Nov. 7, 1984

[51] Int. Cl.⁴ ............................................. H02M 7/08
[52] U.S. Cl. ...................................... 363/87; 363/129
[58] Field of Search ...................... 307/252 N, 252 Q; 363/54, 87, 128, 129, 149, 153, 154; 318/811

[56] References Cited

U.S. PATENT DOCUMENTS

| | | | |
|---|---|---|---|
| 4,028,609 | 6/1977 | Detering | 307/252 N |
| 4,042,873 | 8/1977 | Cox | 363/129 |
| 4,156,896 | 5/1979 | Weiss | 363/87 |
| 4,167,698 | 9/1979 | Podlewski | 363/129 |
| 4,224,662 | 9/1980 | Boniger | 363/87 |
| 4,245,295 | 1/1981 | Gotz et al. | 363/129 |
| 4,286,315 | 8/1981 | Johnson | 363/87 |
| 4,309,749 | 1/1982 | Weibelzahl et al. | 363/87 |
| 4,346,432 | 8/1982 | Gurr | 363/129 |
| 4,361,866 | 11/1982 | Shima et al. | 363/129 |
| 4,385,242 | 5/1983 | Wagener | 307/252 |
| 4,399,395 | 8/1983 | Espelage | 363/87 |
| 4,423,477 | 12/1983 | Gurr | 363/54 |
| 4,467,258 | 8/1984 | Leuthen | 318/800 |
| 4,490,780 | 12/1984 | Nondahl | 363/129 |
| 4,491,778 | 1/1985 | Knox et al. | 318/803 |

FOREIGN PATENT DOCUMENTS

| | | |
|---|---|---|
| 55-7641 | 6/1980 | Japan. |
| 57-31375 | 2/1982 | Japan. |
| 57-88870 | 6/1982 | Japan. |
| 367945 | 12/1978 | U.S.S.R. |

*Primary Examiner*—Patrick R. Salce
*Assistant Examiner*—D. L. Rebsch
*Attorney, Agent, or Firm*—James E. Bradley

[57] ABSTRACT

An SCR firing circuit allows the firing point to be changed. The firing circuit includes a ROM which has an output for each gate of each SCR. The ROM is programmed to fire the SCRs in a desired sequence. The ROM is driven by a counter, which counts pulses from an oscillator, the frequency of which is variable. The difference between the zero cross of the waveform and the ROM output is compared and averaged. The comparator output is summed with a variable DC demand voltage. The sum is applied to an integrator, which provides an integrated output to the oscillator to change the frequency of the oscillator if the firing point is changed.

6 Claims, 9 Drawing Figures

THYRISTOR FIRING CIRCUIT FOR DETERMINING PHASE ANGLE

BACKGROUND OF THE INVENTION

1. Field of the Invention

This invention relates in general to electronic circuits for varying a voltage output, and in particular to a circuit for firing silicon controlled rectifiers.

2. Description of the Prior Art

Silicon controlled rectifiers, hereinafter referred to as SCRs, can be used for providing variable power output. An SCR has a cathode and an anode, one of which may be connected to an AC power supply. The SCR has a gate which when fired, will allow the AC current to pass through the SCR. The SCR will conduct until the voltage reverses polarity. In general, the amount of power output through the SCR depends upon when the gate is fired. If fired early in the AC cycle, more power will flow through the SCR than if fired late in the cycle.

Phase locked loop circuits have been used to insure the operation of a local oscillator at the same frequency as a "reference" signal. A phase locked loop can also detect the amount of change from that frequency. These circuits, however, are expensive and complex.

SUMMARY OF THE INVENTION

In this invention, there is an SCR circuit having at least two SCRs, one of which passes positive current, and one of which passes negative current of an AC waveform. Each SCR has a gate which causes the SCR to block current until the SCR is fired. The circuit includes a ROM (read only memory) which has a plurality of outputs; each output being coupled to the gate of one of the SCRs for firing the SCR. The ROM is programmed to fire each SCR in the desired sequence.

A comparator compares a zero cross of at least one of the phases with the ROM output for that phase to determine the actual phase difference between the firing of the SCR and the beginning of the cycle for that phase. A demand means provides a demand signal proportional to the desired phase difference between the firing of the SCR and the waveform. The output of the comparator and the demand signal are summed, with the difference representing an error between the desired and the actual. This error difference is applied to an oscillator which provides pulses, the frequency of which can be varied depending upon the error difference. A counter counts the pulses of the oscillator and provides a binary output to the ROM for driving the ROM. Any error difference will change the point of firing.

BRIEF DESCRIPTION OF THE DRAWINGS

FIG's. 1A, 1B and 1C show a schematic of a firing circuit for SCRs connected into a rectifying circuit for a three phase waveform.

DESCRIPTION OF THE PREFERRED EMBODIMENT

Figure 2:
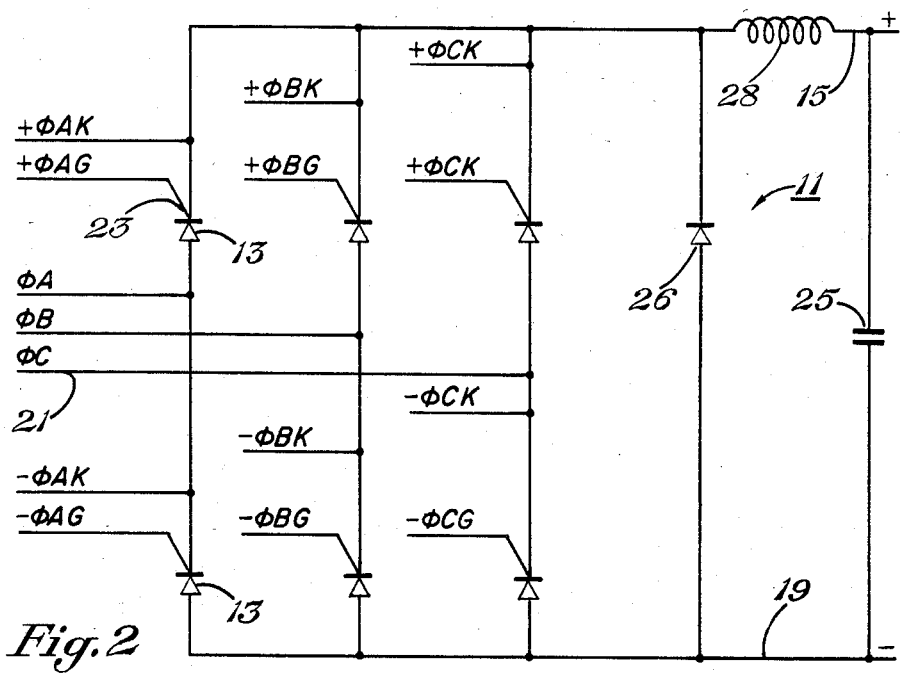
FIG. 2 is a schematic showing the SCRs connected into the rectifying circuit for the three phase waveform.

Referring to FIG. 2, the SCR rectifying circuit 11 includes six SCRs 13, three of which have a cathode connected to a positive DC rail 15. The other three have anodes connected to a negative DC rail 19. A three phase power supply is connected between the SCRs 13, with phase A connected between the first two SCRs, phase B connected between the second two SCRs, and phase C connected between the third two SCRs. Each SCR 13 has a gate 23 which when supplied with a firing signal, will allow the SCR to conduct. A capacitor 25 and diode 26 are connected across the rails 15 and 19. An inductor 28 is connected in rail 15.

Figure 3:
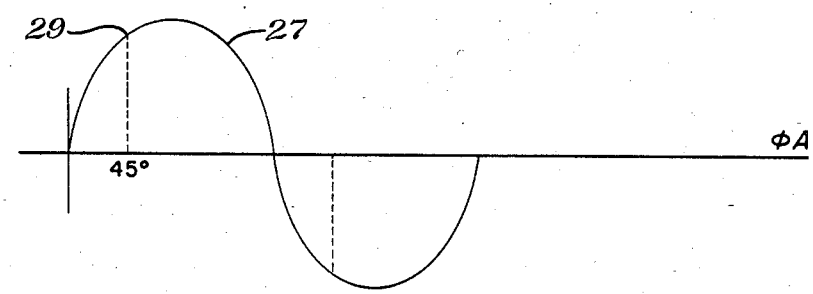
FIG. 3 is a schematic of the three phase waveform during a normal operation with the firing points for the various SCRs in FIG. 2.
Figure 3:
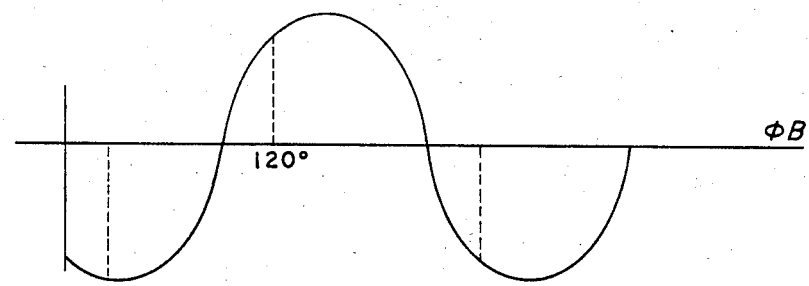
Figure 3:
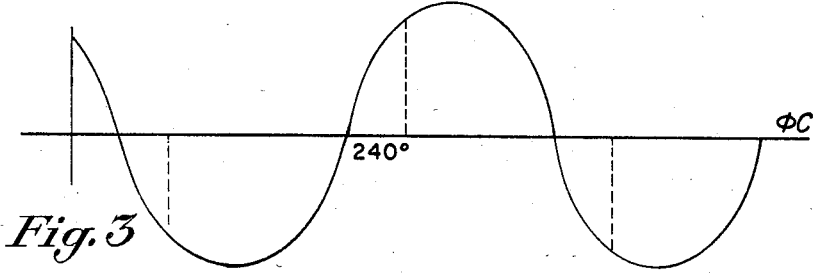

Referring to FIG. 3, the three phase waveform 27 supplied to the SCRs 13 is shown, with phase B being 120 degrees out of the phase with phase A, and phase C being 120 degrees out of phase with phase B. Three of the SCRs 13 will conduct during the positive half of one of the phases A, B and C. The other three of the SCRs 13 will conduct during the negative half of the cycle of one of the phases A, B and C. The firing point 29 at which the SCR begins to conduct is the same for all of the SCRs 13. In FIG. 3, the firing point is shown at approximately 45 degrees after each positive half cycle and each negative half cycle begins. Each SCR 13, once fired, will continue to conduct until the voltage on its particular phase goes opposite in polarity. This results in a DC potential difference between rails 15 and 19 which can be varied by varying the firing point 29.

Figure 1A:
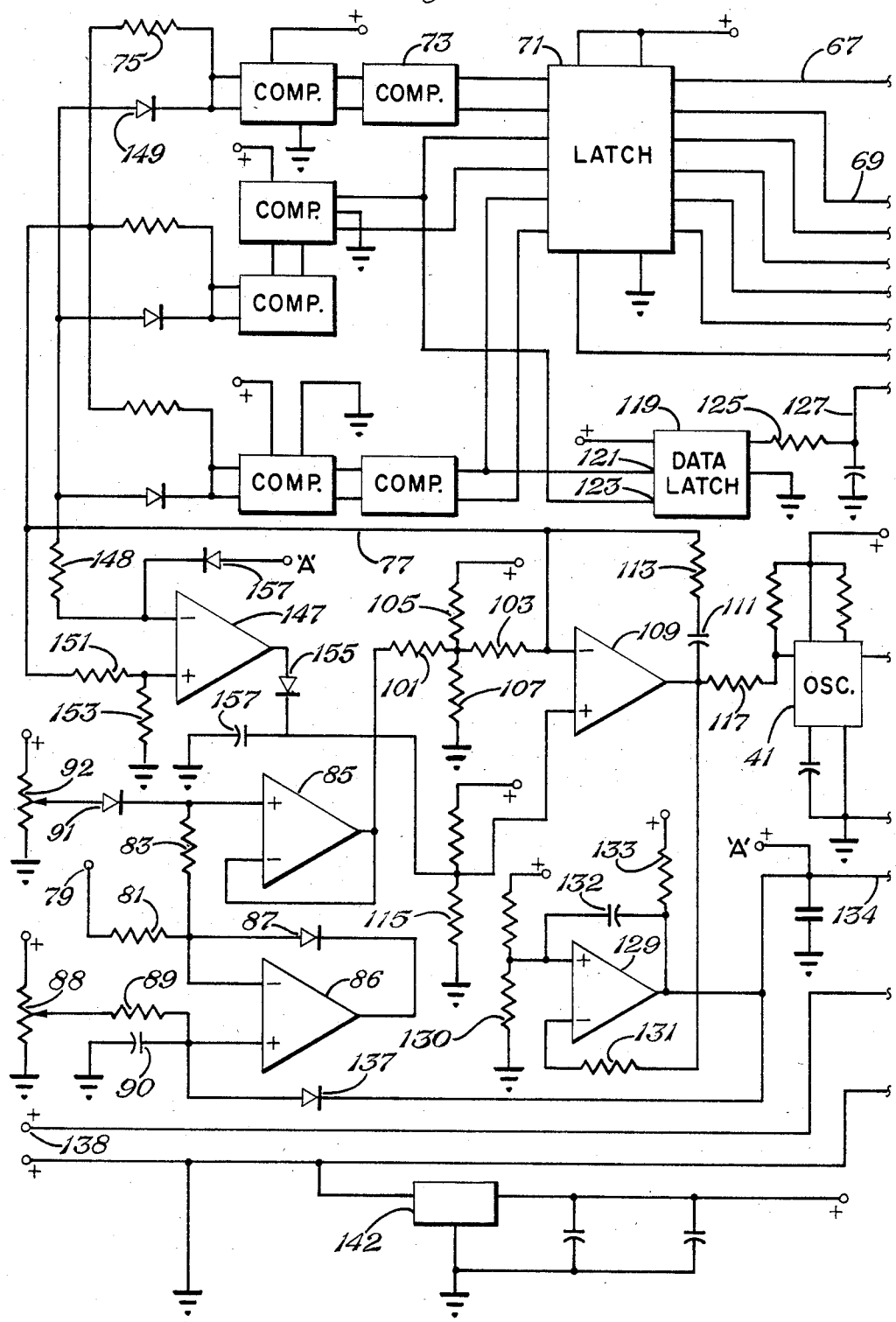
Figure 1B:
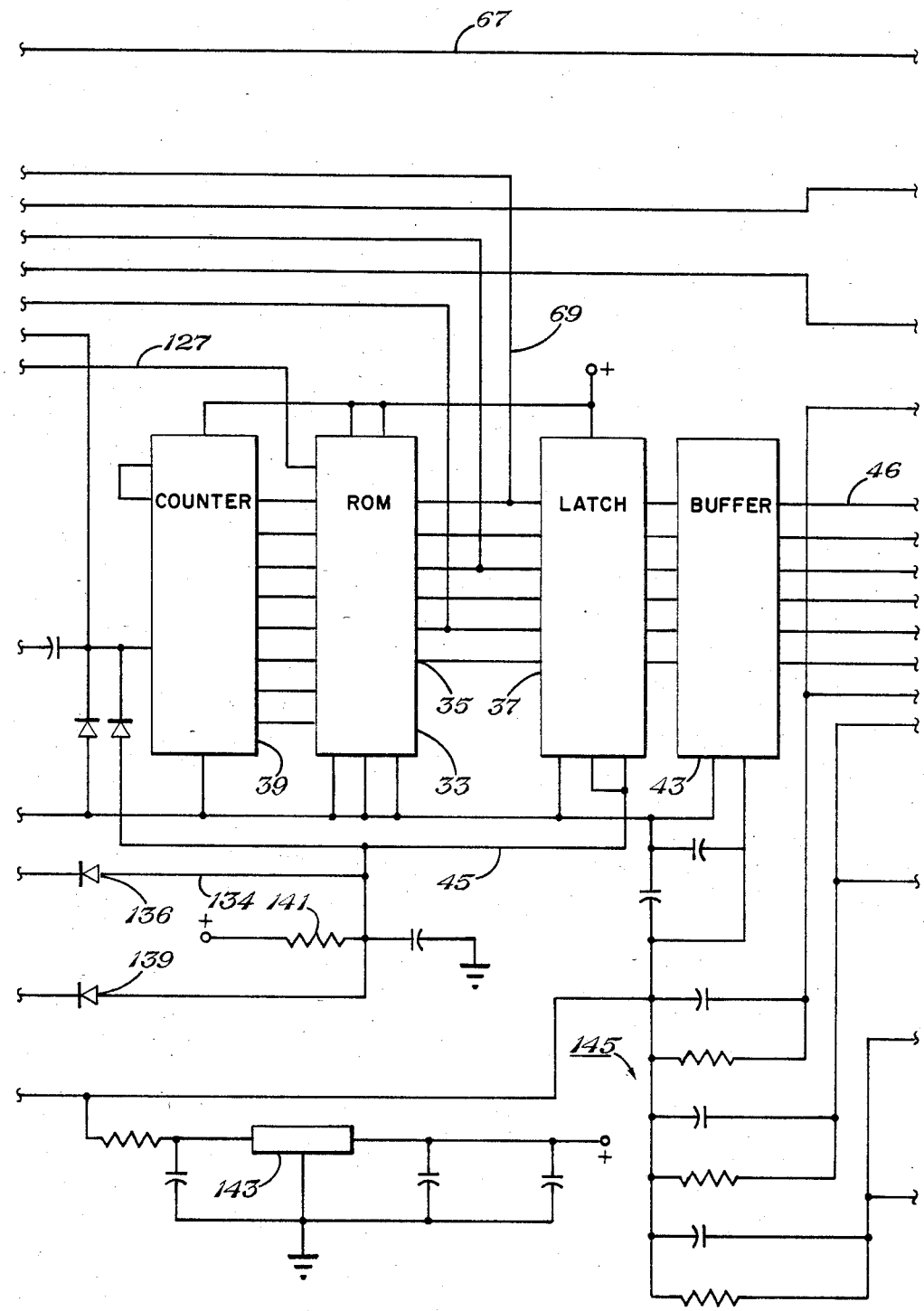

Referring to FIG. 1B, the firing point 29 of the SCR 13 is controlled by a ROM 33. ROM 33 is a conventional memory means, preferably a 2716 circuit, having an output 35 for each of the SCRs 13. The condition of each output 35 directly determines whether or not a firing signal is being supplied to one of the gates 23 of the SCRs 13. For example, if a particular output 35 has a zero output, then a firing signal will not be supplied to the particular gate 23 of the corresponding SCR 13. If a 1 exists on one of the outputs 35, then a firing signal will be supplied to the gate 23 of the corresponding SCR 13. ROM 33 is programmed so that it will fire the gate 23 of each of the SCRs 13 in a desired three phase sequence. The outputs 35 are connected to a latch circuit 37 of conventional design (74C174).

A binary counter 39 which is driven by a variable controlled oscillator 41 (FIG. 1A), drives the ROM 33. The counter counts 256 pulses from the oscillator, then repeats. The oscillator operates at a variable frequency approximately 256 times the three phase waveform frequency, normally 60 Hz. The binary output for each pulse count addresses the input gates of the ROM 33, causing the ROM 33 to provide the desired output for firing the gates 23. The ROM is programmed to provide the firing signal for a selected duration, preferably about 60 degrees, regardless of the firing point 29 (FIG. 2). At the conclusion of the 60 degree duration, the ROM output 35 will go to zero, causing the firing signal to cease. However, the SCR 13 will continue to operate until the change in sign of the AC voltage supplied to it. As can be seen by viewing FIG. 3, the ROM 33 will provide outputs that will fire the SCRs in the following order: positive phase A; positive phase B; negative phase A; positive phase C; negative phase B; and negative phase C.

In firing the SCRs 13, the latch 37 output is applied to a buffer 43 (ULN2004), which has an output on six lines 46. To isolate the low voltage output on buffer 46 from the high voltage existing in SCR circuit 11, six transformers 47 are used. Each firing signal will occur at approximately 60 cycles per second. To avoid distortion because of the relatively low frequency, a line 45 is connected to the latch 37 from the oscillator 41 output. Line 45 alternately stores the information from ROM 33 into the latch 37 and then resets all of the latches to zero. This "breaks up" the 60° signal pulse from ROM 33 into a 60° long pulse train which has the oscillator 41 frequency. This higher frequency signal passes through the transformer 47 and is applied between the gate 23 and the cathode of each SCR 13 as indicated by the matching symbols on FIG. 1C and FIG. 2. The high frequency square wave applied to each gate 23 maintains each gate on for the desired 60 degree duration, and at the three phase frequency, normally 60 HZ. Each transformer 47 is connected conventionally, having a diode 49 in series, and a diode 51 in parallel with a resistor 53.

ROM 33 will fire the SCRs 13 repeatedly in the proper sequence. However, the particular firing point 29 (FIG. 3), depends upon the demand signal. The phase difference between the firing point 29 and the start of each phase of the waveform is monitored by three lines 55, shown in FIG. 1C. One line 55 is connected to the cathode of SCR 13 for negative phase A, the other to the cathode of SCR 13 for negative phase B, and the other to the cathode of SCR 13 for negative phase C. Lines 55 pass through sets of voltage dividing resistors 57 and 61 and lead to one input of three comparators 59.

Figure 4:
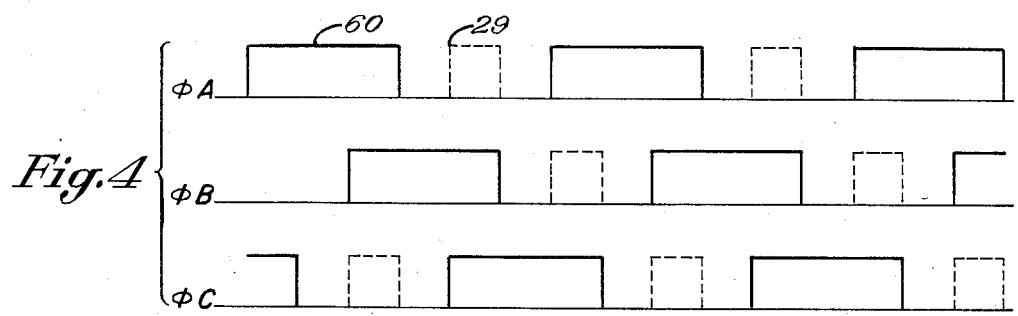
FIG. 4 is a schematic of the reference waveform and the ROM output at the input to the comparators at a startup with the firing signal in the proper phase.

The comparators 59 are connected so as to square the three phase signal monitored. Capacitors 62 connected to each comparator 59 provide filtering. Each comparator 59 has its output conventionally connected to a resistor 63 and capacitor 65, which are also connected to a positive DC supply. The output waveform 60 on lines 67 of comparators 59 is illustrated in FIG. 4 and is a square wave three phase reference signal in phase with the three phase waveform of FIG. 2. The square wave on lines 67 represents the zero crossing of the three phase waveform supplied to the SCRs 13. Lines 67 lead to a latch 71 (74C174), shown in FIG. 1A.

There are three lines 69 (FIG. 1A) also connected to the input of latch 71. These lines 69 are connected to three outputs 35 of ROM 33 (FIG. 1B) which are coupled to three of the SCRs 13. The firing signal for these SCRs 13 will exist on each line 69, which can be compared to the reference signal on lines 67. Unless the firing points 29 are at zero degrees, or in phase with the AC waveform, there will be a difference in phase between the square wave on line 67 and the ROM output on line 69. The firing signal 29 at startup of the firing circuit is illustrated by the dotted lines of FIG. 4. Once locked in, each firing pulse 29 is more than 180 degrees out-of-phase with the reference signal 60 so as to not provide any power on rails 15 and 19 (FIG. 2) until stable and until the demand signal is changed to bring the firing points 29 into the proper phase as shown in FIG. 3.

Figure 5:
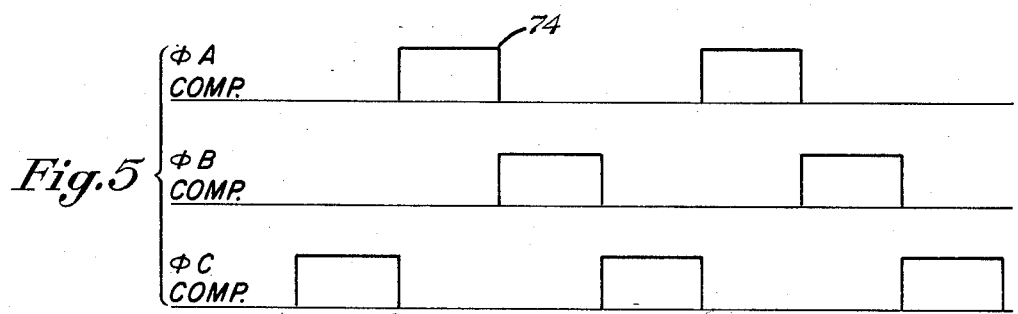
FIG. 5 is a schematic of the output of the comparators at a start up with the firing signal in the proper phase.

Latch 71 applies the reference signal 60 on lines 67 and the ROM outputs 29 on line 69 to three phase comparators 73. The comparators 73 are conventional phase comparators (MC4344), which will determine the difference in phase between the signals on lines 67 and 69 at latch 71, and provide a DC output. As shown in FIG. 5, each comparator 73 provides a pulse 74 of duration equal to the distance between the falling edges of each reference pulse 60 and each firing pulse 29. The DC output 74 of each comparator 73 (each comparator 73 is shown as two blocks) passes through a resistor 75 and is combined or averaged with the outputs of the other comparators 73. The average DC output representing the average phase difference between the firing points 29 and the zero cross of the AC waveform, is applied to a summing line 77, shown in FIG. 1A, which has a nominal DC voltage of 1.5 volts. Line 77 is summed with a DC voltage representing a desired amount of phase difference or demand, this demand voltage being opposite in polarity to the summed output of the comparators 73 with respect to the nominal 1.5 volts.

The combining or summing of the demand voltage with the voltage representing the actual phase difference is handled as shown in FIG. 1A. The demand input 79 is a DC input which passes through resistors 81 and 83 to the positive input of an operational amplifier 85. Operational amplifier 85 has its negative input and output connected together. For clamping the upper limit of the DC demand 79, an operational amplifier 86 has its output connected through a diode 87 to the junction of resistors 81 and 83. A potentiometer 88 is connected through a resistor 89 to the positive input of operational amplifier 86. The negative input of operational amplifier 86 is connected to the junction of resistors 81 and 83. A capacitor 90 is connected between ground and the positive input of operational amplifier 86. A potentiometer 92 is connected through a diode 91 to the positive input of operational amplifier 85 for clamping the lower limit of demand 79.

The DC demand output of operational amplifier 85 is summed with the phase comparators 73 output on line 77 through two resistors 101 and 103. Voltage dividing resistors 105 and 107 are connected to a constant DC source and ground, with their junctions connected between resistors 103 and 105. An operational amplifier connected as integrator 109, having a negative input connected to resistor 103, serves as error means to provide an output based on the sum of the DC demand at resistor 103 and the value on line 77 representing the phase difference. Integrator 109 is connected conventionally, having a capacitor 111 and resistor 113 in series and connected between the output and the negative input. The positive input to integrator 109 is connected to a voltage dividing circuit, between two resistors 115, which are connected between a DC power supply and ground. Resistors 115 set the 1.5 volt signal level on line 77.

The integrator 109 will force its negative input to remain constant and the same as the positive input. The output of integrator 109 is an average constant DC value supplied to the oscillator 41. If the phase difference detected by comparators 73 differs from the demand input 79, the sum of the two outputs applied to integrator 109 causes a different output from the integrator 109, increasing or decreasing the frequency of the oscillator 41, accordingly. The frequency will change only momentarily until the comparators 73 and demand input 79 indicate no error difference, at which time the integrator 109 output will cause the oscillator 41 to return to the normal operating frequency of 256 times 60 hz.

Another feature of the invention is shown in FIG. 1A, and includes data latch 119. Data latch 119 is a conventional circuit (CD4013) which has two inputs 121 and 123. Input 121 is connected between the comparator 73 for phase C and the latch 71. Input 123 is connected between the comparator 73 and latch 71 for phase B. A square wave will be provided to the inputs 121, 123. One of the inputs 121 is the data input to the data latch 119, and the other is the clock input. The output will remain the same so long as the input 121 always goes high after the input 123 also goes high. This indicates that the firing circuit is properly connected to the three phase lines, and not in a reverse order. However, if data latch input 121 goes low before data latch input 123, then that will indicate that phase B and phase C are actually connected out of order. If so, an output is provided through resistor 125 to a line 127.

Line 127 leads to ROM 33, shown in FIG. 1B. ROM 33 is programmed both in the normal sequence, and in a reverse sequence. If line 127 indicates that the circuitry had inadvertently been connected out of sequence, the ROM 33 will electronically rotate in reverse, changing the sequence in accordance with how the circuitry had been connected. This allows the firing circuit to operate normally, even though lines were reversed while connected.

A lost signal comparator means detects if there has been a power failure in the reference or three phase waveform, and prevents erroneous firing due to the failure. If the reference signal on lines 67 is lost, then the phase detector comparators 73 would provide a varying output on line 77, causing a varying output from oscillator 41. To prevent this, a comparator or operational amplifier 129 is used. The nominal voltage on line 77 if the signals on lines 67 and 69 are in phase is about 1.5 volts. If the signal on line 67 is lost, the output for comparators 73 goes negative with respect to the nominal voltage or down to about 1.0 volt. The output of integrator 109 will go higher, and this output is connected to the negative input of comparator 129 through a resistor 131. This higher value is compared to the preset positive input, which is connected to the voltage dividing resistors 130. The higher value on the negative input than the preset reference value causes comparator 129 to go negative. The negative value passes through a diode 136 on line 134 (FIG. 1B) to line 45 to inhibit latch 37 to stop the firing pulses from ROM 33 from passing to the SCRs 13 until the reference signal on line 67 is restored. The low output from comparator 129 also passes through a diode 137 (FIG. 1A) to reset the demand voltage output to a quiescent point. Comparator 129 has a positive voltage applied to its positive input through a resistor 133 and capacitor 132.

Line 45 (FIG. 1B) is also connected to an inhibit line 138 through a diode 139 (FIG. 1B). Bringing line 138 low with an external signal will also stop firing pulses from being transmitted to the SCRs.

The power supply for the circuitry in FIG's. 1A, 1B and 1C includes power supply regulating integrated circuits 142 and 143, connected conventionally. These are connected to a series of resistors and capacitors 145, which are connected to the transformers 47 (FIG. 1C).

Figure 1C:
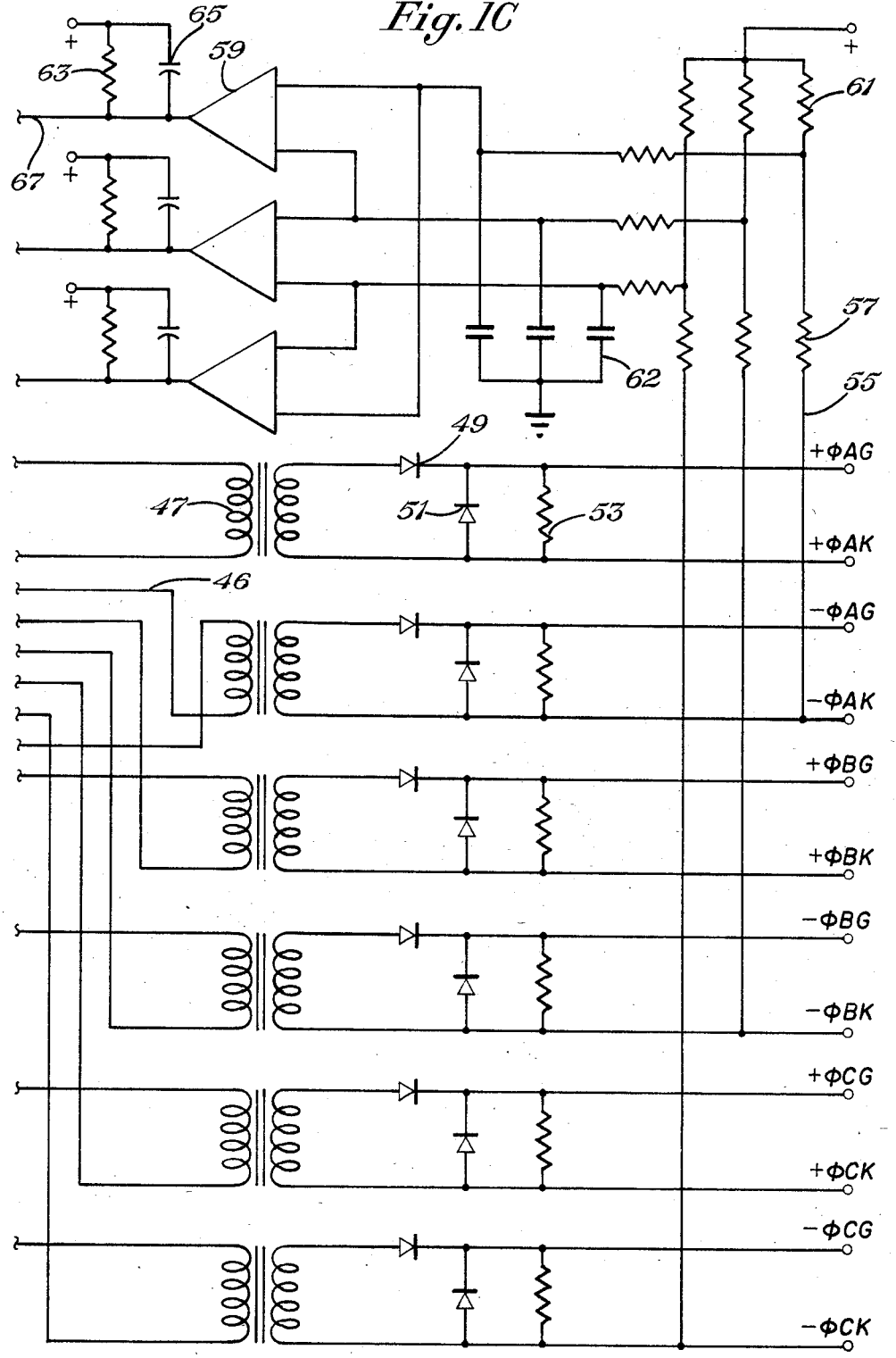

A number of the elements shown in the FIGS. 1A, 1B, and 1C are not described in detail nor enumerated as they are conventional.

There is also a provision for assuring that the firing circuit will not lock in and fire at the wrong phase angle at start up. Normally at startup, the DC demand 79 is set so as to cause firing signals to be sent to SCRs 13 when each SCR is in the half cycle of opposite polarity, for example at about 200°–230° phase difference as shown in FIG. 4. This prevents the SCRs 13 from conducting until the system is operating at a steady state value, with each firing signal at the same phase difference. Then the DC demand 79 is changed to decrease the phase difference until the SCRs 13 are firing in the half cycle of proper polarity, causing them to conduct. The phase comparators 73 will detect phase differences, and whether lagging or leading, from −360° to +360°.

Figure 6:
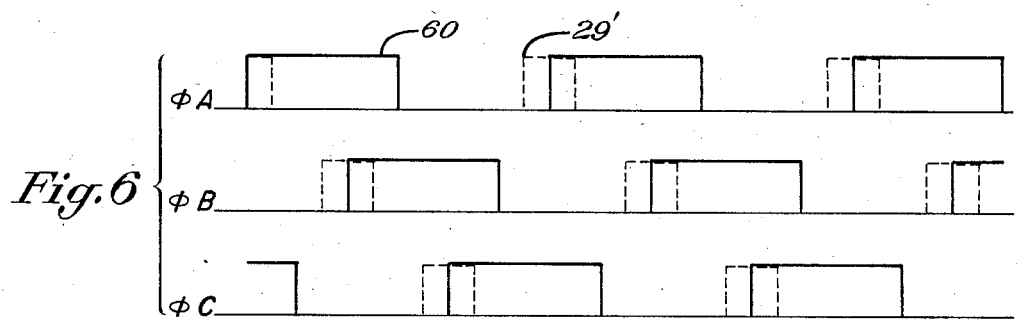
FIG. 6 is a schematic of the reference waveform and the ROM output at the input of the comparators at a startup when the firing signal is partially in the wrong phase.
Figure 7:
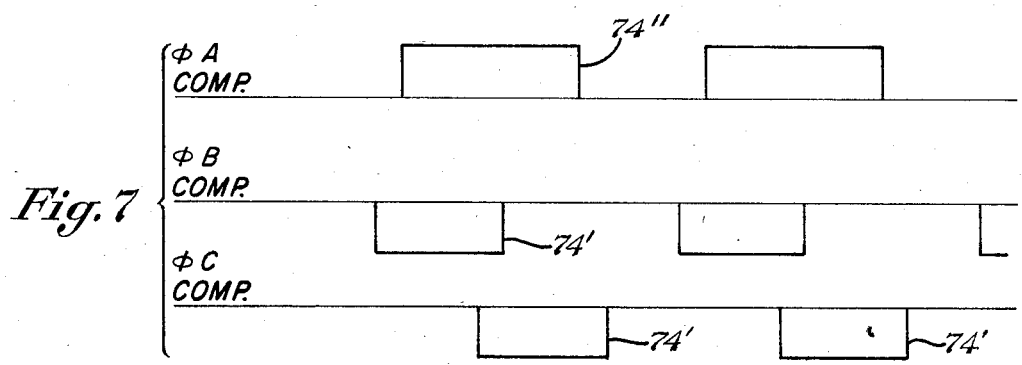
FIG. 7 is a schematic of the output of the comparator at startup when the firing signal is partially in the wrong phase.

If the firing signals 29 initially locate as in FIG. 4, all of the phase difference pulses 74 are positive because each signal 29 lags each reference signal 60. However, if the 60° firing signals 29' at a startup start at greater than 300° with respect to the reference signals 60, as shown in FIG. 6, an erroneous lockup could occur. As shown in FIG. 7, one or more of the phase difference pulses 74' output from the comparators 73 might erroneously be negative based on the difference between the falling edge of the first complete reference signal 60 and the falling edge of first complete firing pulse 29'. At least one phase difference pulse 74" would be opposite in polarity, correctly indicating a lagging phase difference. The average of the phase difference pulses 74' and 74" would be summed and applied to line 77. This could cause firing at the wrong point because the negative pulses 74' would cause the nominal voltage on line 77 to drop below 1.5 volts during their duration.

Circuitry shown in FIG. 1A, is employed to prevent this occurence by detecting if one of the outputs of each comparator 73 is negative with respect to the others. An operational amplifier 147 has its negative input connected through a resistor 148 to a junction of three diodes 149, each of which is connected to the output of one of the comparators 73. The positive input to operational amplifier 147 is connected through a resistor 151 to line 77 so that it will operate as a comparator. The positive input is also connected to ground through a resistor 153. The output of operational amplifier 147 is connected through a diode 155 to the positive input of integrator 109. A capacitor 157 is connected between diode 155 and ground.

Lines 77 is always at an average of 1.5 volts. Using this as a reference, if any of the comparators 73 is negative with respect to 1.5 volts (as pulse 74' in FIG. 7), the output of operational amplifier 147 goes high. This causes integrator 109 to go high, causing the oscillator 41 to drastically reduce its frequency and forcing comparator 129 low to inhibit output pulses. This forces the circuit completely out of lock and causes it to try to lock up again. This will happen as many times as necessary to insure that the circuit comes up in the proper configuration.

A negative pulse output of a comparator 73 with respect to 1.5 volts, can occur during normal operation after startup, particularly if demand 79 is set for an extremely short delay angle. These negative pulses do not indicate improper lock up. Provisions are made to avoid operational amplifier 147 from driving the circuit out of lock if this occurs. This is done by ANDing the inhibit signal on line 134 with the output of the comparators 73 between diodes 149 and the operational amplifier 147. The points marked "A" indicate the connection. A diode 157 is connected into the line from point "A". Once the circuit has detected lock up and the inhibit signal on line 134 has gone away, the positive voltage at point "A" will insure that the output of operational amplifier 147 stays low.

In operation, three phase power is supplied to the SCRs 13, as shown in FIG. 2. Firing signals are supplied by the ROM 33 in the sequence indicated in FIG. 3. This allows the SCRs 13 to begin conducting at the desired intervals. This results in DC voltage on rails 15 and 19, the magnitude of which depends upon the particular firing points 29. The three phase waveform is monitored and applied to zero crossing means 59, which squares the waveforms into a square wave reference signal. Zero cross of the reference signal is compared to the generated signal of the ROM 33 output by comparators 73 to indicate a phase difference between the firing points 29 and the zero cross. The phase difference is averaged by the three comparators 73 and summed with a DC demand voltage at the input of integrator 109, the DC demand voltage being opposite in polarity.

If there is no difference between the demand and the actual phase difference, the integrator 109 will continue providing a constant output to the oscillator 41. The oscillator output 41 is counted by the counter 39 to drive the ROM 33. If there is a difference indicated in the error or change between the demand and the actual phase difference, the integrator 109 will change its output. This change in output will change the frequency of the oscillator 41 to move the firing point 29 closer or farther from the zero cross. On the next half cycle, the demand voltage and the voltage resulting from the average actual phase difference should equal each other and would cause the integrator 109 to return to the normal value and the oscillator to return to the normal frequency.

The invention has significant advantages. The circuit is less expensive than phase locked loop circuits of a conventional design. The circuit allows the firing of the SCRs to be easily and quickly changed. Provision for ceasing firing signals during power interruption, and avoiding firing error at startup are provided.

While the invention has been shown in only one of its forms, it should be apparent to those skilled in the art that it is not so limited but is susceptible to various changes without departing from the scope of the invention.

I claim:

1. In a thyristor circuit having at least two thyristors, one for passing positive current and one for passing negative current of a waveform, each having a gate which causes the thyristor to conduct when the thyristor is fired, an improved means for firing the thyristors, comprising in combination:
   a ROM having a plurality of memory locations, each memory location containing the on/off condition of one of the thyristors at a particular increment of the waveform, the ROM having a plurality of data lines, each of which is coupled to the gate of one of the thyristors for firing the thyristor;
   comparator means having one input connected to a source of the waveform and another to one of the data lines for comparing a zero cross of the waveform with the ROM output on the data line to determine an actual phase difference between the firing of the thyristor and the beginning of the waveform, and to produce a pulse whose width is proportional to the phase difference;
   means for smoothing the pulses into a DC voltage proportional to the actual phase difference;
   demand means for providing a DC demand voltage proportional to a desired phase difference between the firing of the thyristors and the waveform;
   error means for determining the error difference between the demand voltage and the phase voltage;
   oscillator means for providing a constant frequency of pulses at some multiple of the line frequency and also connected to the error means for momentarily changing the frequency of the pulses if a phase error difference exists; and
   counter means for counting the pulses of the oscillator means and providing a binary output to the ROM that determines which particular increment of the waveform the ROM should output on its data lines.

2. In thyristor circuit having at least two thyristors connected to each phase of a three phase waveform, one for passing positive current and one for passing negative current in each phase, each having a gate which causes the thyristor to conduct when the thyristor is fired, an improved means for firing the thyristors, comprising in combination:
   a ROM having a plurality of memory locations, each memory location containing the on/off condition of one of the thyristors at a particular increment of the waveform, the ROM having a plurality of data lines, each of which is coupled to the gate of one of the thyristors for firing the thyristor;
   comparator means having one input connected to a source of the waveform and another to one of the data lines for comparing a zero cross of each phase of the waveform with the ROM output on the data line to determine an actual phase difference between the firing of the thyristor for each phase and the beginning of the phase, and to produce a pulse whose width is proportional to the phase difference;
   means for smoothing the pulses into a DC voltage proportional to the actual base difference;
   demand means for providing a DC demand voltage proportional to a desired phase difference between the firing of the thyristors and the waveform;
   error means for determining the error difference between the demand voltage and the phase voltage;
   oscillator means for providing a constant frequency of pulses at some multiple of the line frequency and also connected to the error means for momentarily changing the frequency of the pulses if a phase error difference exists;
   counter means for counting the pulses of the oscillator means and providing a binary output to the ROM that determines which particular increment of the waveform the ROM should output on its data lines; and
   sequence detecting means for monitoring two of the phases and providing a first output if the phases are in normal sequence and a second output if the phases are in reverse sequence;
   the ROM being connected to the sequence detecting means and being programmed to operate in a reverse sequence if the second output is received.

3. In a thyristor circuit having at least two thyristors connected to each phase of a three phase waveform, one for passing positive current and one for passing negative current in each phase, each having a gate which causes the thyristor to conduct when the thyristor is fired, an improved means for firing the thyristors, comprising:

a ROM having a plurality of memory locations, each memory location containing the on/off condition of one of the thyristors at a particular increment of the waveform, the ROM having a plurality of data lines, each of which is coupled to the gate of each thyristor for firing the thyristor;

reference means for providing an in-phase reference signal for each phase;

squaring means connected to the circuit for squaring each of reference signals to provide a zero cross for each reference signal;

comparator means having one input connected to the squaring means and another to one of the data lines for comparing the zero cross of each reference signal with the ROM output on the data line for each phase to determine a phase difference for each phase, for producing a pulse for each phase whose width is proportional to the phase difference and for averaging the pulses proportional to the three phase differences into a single DC phase voltage output;

demand means for providing a DC demand voltage proportional to a desired phase difference between the firing of the thyristors and the waveform;

error means for determining the error difference between the demand voltage and the phase voltage;

oscillator means for providing a constant frequency of pulses at some multiple of the line frequency and also connected to the error means for momentarily changing the frequency of the pulses if a phase error difference exists;

counter means for counting the pulses of the oscillator means and for providing binary outputs to the ROM that determine which particular increment of the waveform the ROM should output on its data lines; and data latch means having two inputs, one connected to the data line of the ROM for a phase B and the other connected to the data line of the ROM for a phase C, for monitoring the firing pulses provided to the thyristors, and for providing a reversing signal to the ROM if the pulse for phase C during a 360 degree waveform occurs before the pulse for phase B, the ROM being of a type that will operate in reverse sequence if the reversng signal is received, enabling the circuit to operate without reconnecting the thyristors.

4. In a thyristor circuit having two thyristors connected to each phase of a three phase waveform, one for passing positive current and one for passing negative current in each phase, each having a gate which causes the thyristor to conduct when the thyristor is fired, an improved means for firing the thyristors, comprising:

a ROM having a plurality of memory locations, each memory location containing the on/off condition of one of the thyristors at a particular increment of the waveform, the ROM having a plurality of data lines, each of which is coupled to the gate of one of the thyristors for firing the thyristor in direct response to each ROM output;

reference means for providing a three phase reference signal in phase with the three phase waveform;

squaring means connected to the circuit for squaring each of the reference signals to provide a zero cross for each reference signal;

comparator means having one input connected to the squaring means and another to one of the data lines for comparing the zero cross of each phase of the reference signal with the ROM output on the data line for each phase, for producing a pulse for each phase whose width is proportional to the phase difference and for averaging the pulses into an average phase voltage output;

demand means for providing a DC demand voltage proportional to a desired phase difference between the firing of the thyristors and the waveform;

error means for determining an error difference between the demand voltage and the phase voltage;

oscillator means for providing a constant frequency of pulses at some multiple of the line frequency and also connected to the error means for momentarily changing the frequency of the pulses if a phase error difference exists;

counter means for counting the pulses of the oscillator means and for providing a binary output to the ROM that determines which particular increment of the waveform the ROM should output on its data lines; and lost signal comparator means for comparing the output of the phase comparator means to a selected reference and providing a disabling output to the ROM to prevent the firing of the thyristors if the output of the phase comparator means indicates that the reference signal is interrupted.

5. In a thyristor circuit having at least two thyristors connected to each phase of a three phase waveform, one for passing positive current and one for passing negative current in each phase, each having a gate which causes the thyristor to conduct when the thyristors are fired, an improved means for firing the thyristors, comprising:

a ROM having a plurality of memory locations, each memory location containing the on/off condition of one of the thyristors at a particular increment of the waveform, the ROM having a plurality of data lines, each of which is coupled to the gate of each thyristor for firing the thyristor;

reference means for providing an in-phase reference signal for each phase;

squaring means connected to the circuit for squaring each of reference signals to provide a zero cross for each reference signal;

comparator means having three comparators, each having one input connected to the squaring means and another to one of the data lines, each for comparing the zero cross of each reference signal with the ROM output on the data line for each phase to determine a phase difference for each phase, for producing a pulse for each phase whose width is proportional to the phase difference and for averaging the pulses proportional to the three phase differences into a single DC phase voltage output;

demand means for providing a DC demand voltage proportional to a desired phase difference between the firing of the thyristors and the waveform;

error means for determining the error difference between the demand voltage and the phase voltage;

oscillator means for providing a constant frequency of pulses at some multiple of the line frequency and also connected to the error means for momentarily changing the frequency of the pulses if a phase error difference exists;

counter means for counting the pulses of the oscillator means and for providing binary outputs to the ROM that determine which particular increment of the waveform the ROM should output on its data lines; and means connected to the outputs of each of the comparators for determining at startup whether one of the outputs of the comparators is opposite in polarity to the other comparators, and for inhibiting firing pulses to the thyristors until all of the outputs of the comparators are the same polarity.

6. In a thyristor circuit having at least two thyristors connected to each phase of a three phase waveform, one for passing positive current and one for passing negative current in each phase, each having a gate which causes the thyristor to conduct when the thyristors are fired, an improved means for firing the thyristors, comprising:

a ROM having a plurality of memory locations, each memory location containing the on/off condition of one of the thyristors at a particular increment of the waveform, the ROM having a plurality of data lines, each of which is coupled to the gate of each thyristor for firing the thyristor;

reference means for providing an in-phase reference signal for each phase;

squaring means connected to the circuit for squaring each of reference signals to provide a zero cross for each reference signal;

comparator means having three comparators, each having one input connected to the squaring means and another to one of the data lines, each for comparing the zero cross of each reference signal with the ROM output on the data line for each phase to determine a phase difference for each phase, for producing a pulse for each phase whose width is proportional to the phase difference and for averaging the pulses proportional to the three phase differences into a single DC phase voltage output;

demand means for providing a DC demand voltage proportional to a desired phase difference between the firing of the thyristors and the waveform;

error means for determining the error difference between the demand voltage and the phase voltage;

oscillator means for providing a constant frequency of pulses at some multiple of the line frequency and also connected to the error means for momentarily changing the frequency of the pulses if a phase error difference exists;

counter means for counting the pulses of the oscillator means and for providing binary outputs to the ROM that determine which particular increment of the waveform the ROM should output on its data lines; and startup comparator means having an input connected to each output of the comparators for detecting at startup whether any of the outputs of the comparators are different in polarity than the others and if so, for providing a disabling output to the ROM to prevent locking of the circuit until the outputs of the comparators are all the same polarity; and disabling means for disabling the startup comparator means once the circuit has stabilized.

* * * * *

UNITED STATES PATENT OFFICE
CERTIFICATE OF CORRECTION

Patent No. 4,598,353     Dated 7/1/86

Inventor(s)    John M. Leuthen

It is certified that error appears in the above-identified patent and that said Letters Patent are hereby corrected as shown below:

Column 4, line 63, "outpuf" is changed to -- output--;

Column 8, line 43, "base" is changed to -- phase--;

Column 9, line 51, "reversng" is changed to --reversing--.

Signed and Sealed this

Twenty-eighth Day of October, 1986

[SEAL]

*Attest:*

DONALD J. QUIGG

*Attesting Officer*     *Commissioner of Patents and Trademarks*